UNITED STATES PATENT OFFICE.

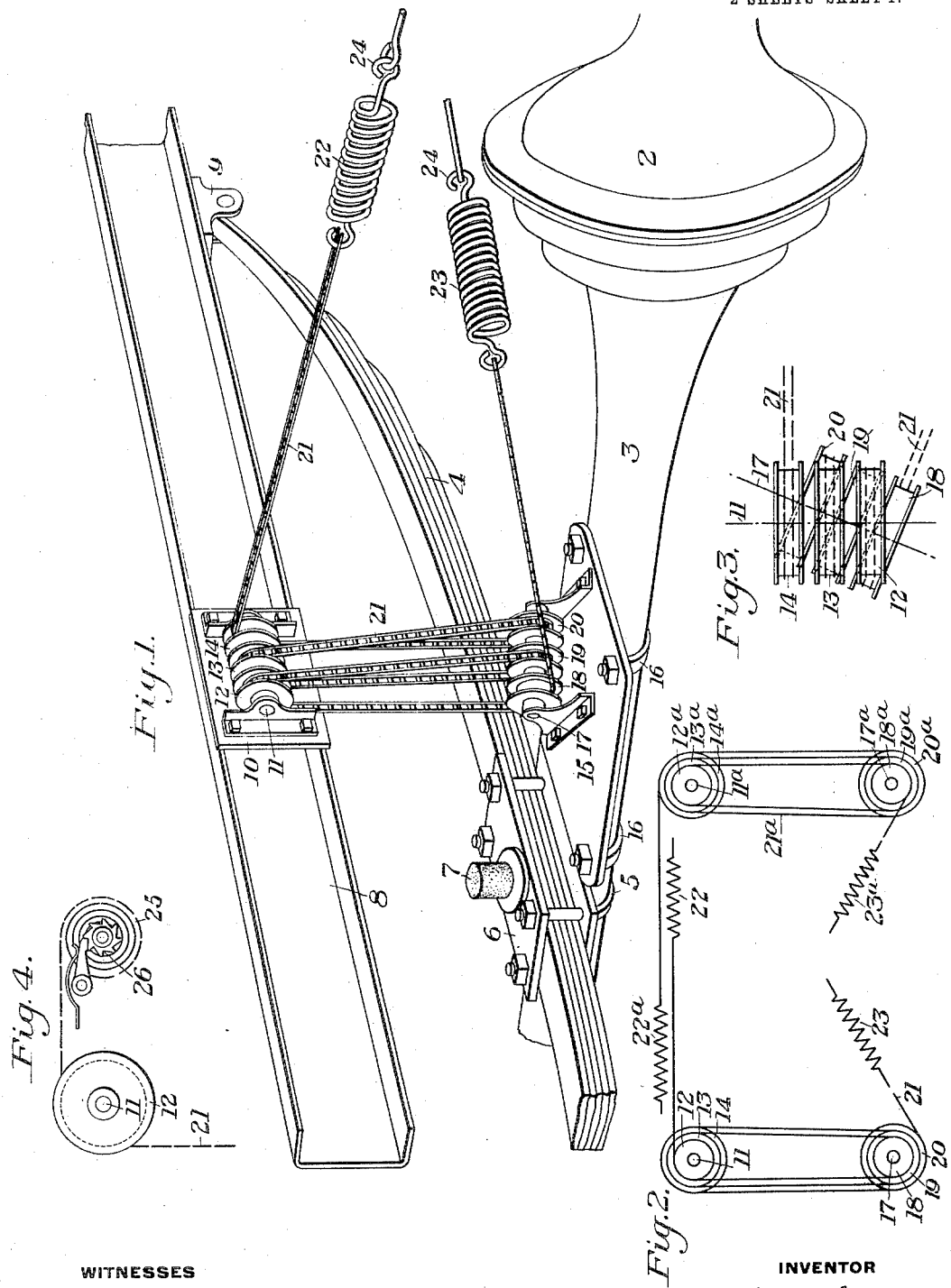

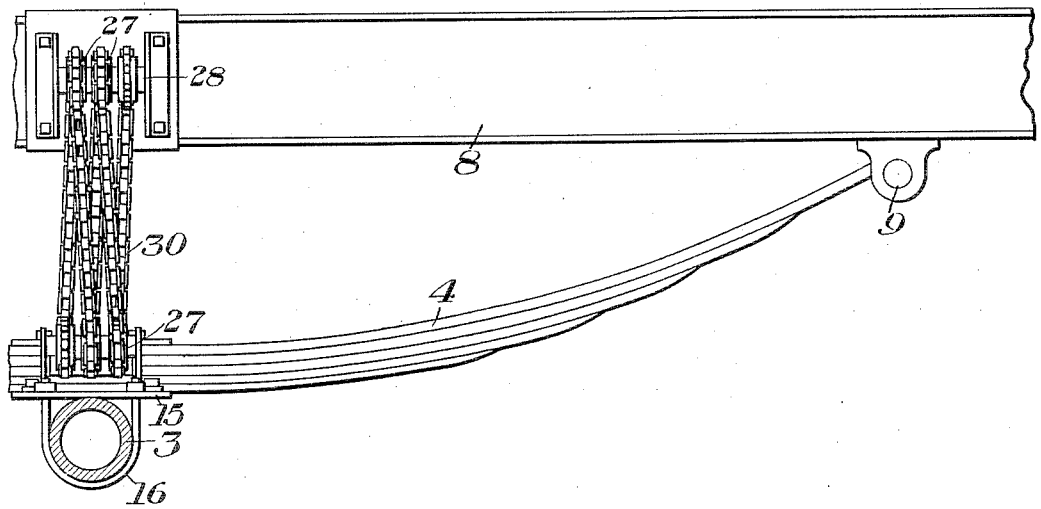
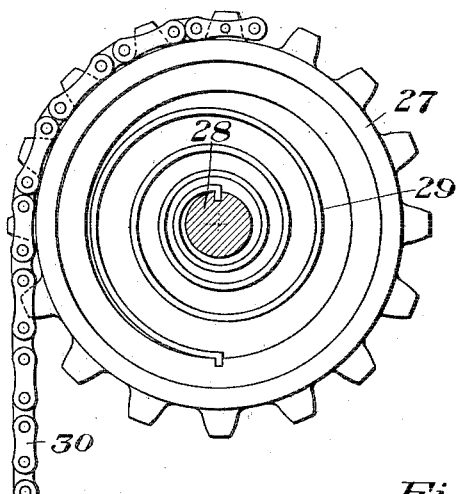
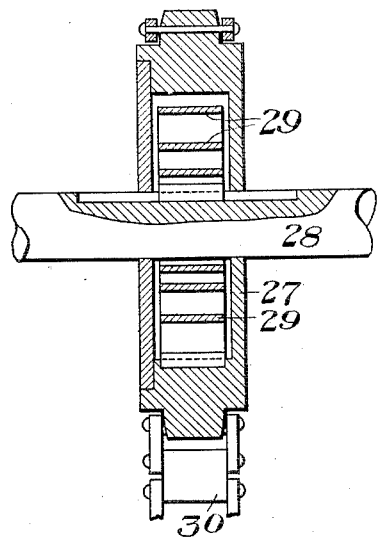

KLAUS J. STEINER, OF PITTSBURGH, PENNSYLVANIA.

SHOCK-ABSORBING DEVICE FOR VEHICLES.

1,068,182.        Specification of Letters Patent.       Patented July 22, 1913.

Application filed October 26, 1912. Serial No. 727,918.

*To all whom it may concern:*

Be it known that I, KLAUS J. STEINER, a resident of Pittsburgh, county of Allegheny, and State of Pennsylvania, have invented a new and useful Improvement in Shock-Absorbing Devices for Vehicles, of which the following is a full, clear, and exact description, reference being had to the accompanying drawings, forming part of this specification, in which—

Figure 1 is a perspective view illustrating the application of my invention to one side of the rear spring of an automobile; Figs. 2 and 3 are diagrammatic views hereinafter more specifically described; Fig. 4 is a detail view showing a modification; Fig. 5 is a side view illustrating another modification; Figs. 6 and 7 are views showing in side elevation and section, respectively, the pulley wheel employed in the construction of Fig. 5; and Fig. 8 is a detail view showing another modification.

My invention has relation to a device for absorbing the shocks to which the bodies and other parts of automobiles and other vehicles equipped with springs placed between the frames and axles of such vehicles are subjected, on account of the rebounding action of the springs after being compressed, when the wheels of the vehicles strike obstructions or irregularities in the road.

It is well known that the body of a vehicle when its wheels encounter an obstruction or irregularity tends, by its own inertia, to remain more or less uniformly in the horizontal plane which it occupied before the obstruction was encountered. Because of this body inertia, upon contact of the wheels with any road irregularity, the vehicle springs deflect and immediately thereafter endeavor to resume their normal condition, this action of the springs being commonly known as the "rebound." Unless controlled in some manner, this rebound of the springs is apt to result in severe shocks and sudden upward thrusts on the body of the vehicle, leading in many cases to the ejection of its occupants or to broken springs. The breakage of the springs invariably occurs, not during the initial deflection but upon the reflection or rebound, this being the least controlled of the two actions.

Numerous devices have heretofore been designed for the purpose of properly controlling the action of vehicle springs, but in so far as I am aware, they have all been subject to numerous difficulties, such as inefficient action, undue wear, liability to breakage, etc.

My invention is designed to provide a simple and efficient shock-absorbing device which will be effective in its operation and will obviate the difficulties heretofore experienced.

In carrying out my invention, I make use of the well known principle of the pulley block and tackle, because of its property of offering no impediment to the sudden approach of one block to the other of a pair of blocks, while any force tending to separate the two blocks must first operate through the leverage of the blocks, which leverage is a function of the number of pulleys or sheave wheels in the set of blocks and of the resistance at the ends of the rope. Furthermore, the application of such a device for this purpose is extremely simple and efficient, being prompt in action and also free from objectionable rattle. It can be cheaply constructed and inexpensively manufactured, and as the working parts are simple lubricated bearings, it is capable of lasting a long time, and when any of the parts become worn, they can be easily repaired by the insertion or replacement of bushings in the pulley wheels.

In Fig. 1 of the accompanying drawings, I have illustrated in general the application of my invention to one side of the rear spring of an automobile, the drawing being, however, in some respects conventional, and the construction and arrangement as there shown being capable of various modifications in the details of construction and arrangement of parts within the scope of the appended claims. In these drawings, the numeral 2 designates the differential gear housing of the rear shaft, and 3 the axle housing through which the rear axle passes. 4 is the rear spring, which is shown as secured to the axle housing by means of the saddle 5 and spring clip device 6, the latter having a rubber bumper 7, to limit the bound of the spring. 8 designates the channel iron which forms the side of the vehicle frame and to which the spring 4 is secured in any usual or suitable manner, as by a hanger 9 at each end. Rigidly secured to this channel frame 8 is a plate 10, having mounted thereon a pulley shaft 11, carrying a plurality of pulley or shaft wheels 12, 13 and 14. On the axle housing 3 adjacent to the spring clip device 6 is mounted a similar device consisting of a plate 15, fastened to the axle housing by suitable clips 16. Mounted on this plate is a pulley shaft 17, carrying several sheave wheels, 18, 19 and 20. 21 is a flexible member, such as a rope of wire or hemp, but preferably a flat chain similar to a bicycle sprocket chain, made of hardened steel links or plates and pins. I have found a suitable construction for this chain in the well known cable sash chain of the trade, although the materials of such chains are too soft for the purpose for which it is here used. This chain is passed around the two sets of sheaves or pulleys, one end being attached to a helical spring 22 and the other end to a similar spring 23. These two springs are, in turn, attached in a state of tension to suitable eyes 24, leading to fixed points of attachment on the frame of the vehicle.

In Fig. 2 I have shown diagrammatically the arrangement and attachment of the chains for a complete set of two shock absorbers for the rear springs of a vehicle. In this diagram, the various sheave wheels have been illustrated as of different diameters in order to clearly show the manner in which the chains are led through the blocks and attached to the helical coil springs. In this figure, the same numerals are employed as in Fig. 1, to designate the corresponding parts, but for the device at the opposite end of the axle, the letter "a" has been added to these numerals. Care must, of course, be exercised that there should be no interference between the chains and helical springs of opposite sets, due to their radius of action. This interference can be readily avoided by properly locating the fixed points on the frames to which the helical spring ends are attached. It is also necessary to have sufficient length of chain issuing from the leading-out sheaves of the blocks and extending to the helical springs, as shown in Fig. 1, so that when the rebound of the vehicle spring has reached its limit and the pulley blocks are separated the maximum distance, the eyes of the springs are not in danger of being drawn against the sheave wheels.

In order that the device may operate without undue friction of the chain against the flanges of the sheave wheels, and to reduce the side twist or bend in the rope or chain caused by the distance which the necessities of actual construction impose between the center lines of the planes of the sheave wheels, it is advisable to mount the upper and lower pulley blocks with their shafts or axes at an angle to each other, as shown in Fig. 3, instead of in the same plane. By this means, the amount of "cross-over" in the chains is practically eliminated, and the latter are caused to travel in nearly straight lines from each sheave to its mate below or above. By this arrangement, the chain is subjected to only a slight torsional twist, which the looseness in the pins and links will permit more readily than any bend from the line of the side of the chain, such as would occur if some means for eliminating "cross-over" were not adapted. Such a means is particularly advisable where chains of the cable sash or bicycle sprocket type are used. The angularity of the two pulley shafts is dependent upon the distance of the center lines of the planes of the sheaves, and becomes more obtuse the greater such distance. It is therefore desirable in the construction of the pulley blocks for this purpose that they should be made as narrow as possible and that they be placed as closely together on their shafts as the limits of construction will permit. The result of the angular difference in the axes of the shafts is that the ends of the ropes or chains will issue at the same angular difference to each other. This is not objectionable, since it offers a means of so locating the fixed points on the frames to which the helical springs are attached, that the springs at opposite ends of the chains or on the ends of opposite chains will not interfere with the action of each other. The ends of the chains should be led off the sheave wheels in a direction coinciding as nearly as possible with the planes of the center lines of the sheaves.

The operation of the device is as follows: When the vehicle is loaded, the springs 4 deflect without resistance on the part of the pulley blocks; on the contrary, the force of the helical coil springs, acting through the leverage of the blocks, assists in the deflection of the springs 4. The pulley blocks then approach each other, and the tension of the helical springs at once takes up any slack in the chains, maintaining the latter in a rigid state of engagement with the sheave wheels. When the bound of the spring 4 occurs, the pulley blocks approach each other suddenly and to a greater extent, but the helical springs being in strong tension take up all the added slack in the chain. At the instant the spring 4 starts to rebound, it immediately meets the resistance of the helical springs, and this resistance being multiplied several times by the leverage of the pulley blocks, the rebound can not take place until this multiplied force of the pulley blocks, tending to restrain it, has been overcome by pulling the chain through the blocks against their leverage. As the distance between centers of shafts and two sets of pulley blocks increase, the added length of chain required to permit this separation of the blocks must be obtained at the expense of the resiliency of the helical springs, and as their resistance to further stretching becomes greater, the more they are stretched, within the limits of their resiliency, the force of their tension multiplied by the leverage of the pulley blocks, becomes greater and greater as the rebound proceeds. Hence the rebounding spring 4 meets a constantly increasing and resisting force, which results in said spring 4 being brought gradually to a state of comparative rest. By thus controlling the vehicle spring, a much improved spring action is obtained, the motion of the vehicle body is smoother, and its up and down limits of vibration are diminished, thereby relieving it of sudden, uncontrollable jolts due to rebounding springs. This not only adds to the comfort of the occupants, but it protects the operative mechanism of the vehicle from destructive jars and shocks.

It will be noted that I have shown both ends of each rope or chain attached to movable points, namely, the eyes of the helical springs. This is contrary to the usual practice in the application of pulley blocks, in which one end of the rope is fixed to either one of the blocks or to an outside fixed point, while the other end is free to move. While my arrangement of two movable ends to the rope or chain is not absolutely essential to gain the desired end, I find it leads to better results to have both ends of the chain in tension and ready to act instantly in taking up the slack when the two blocks approach each other. Otherwise, the slack chain must travel through all the sheaves of the two blocks of the system, and this on account of the inertia of the chain, requires an appreciable period of time and tends to produce back lash or slackening of the chain. This, in turn would tend to cause the chain to climb up over the flanges of the sheave wheels and would result in sudden shocks when the limit of slackness is reached. The inflexible arrangement resulting from having one end of the chain fixed also requires the use a spring having resiliency enough to take up twice the amount of slack chain which each spring is required to do under my preferred arrangement, and as the flexure of helical or spiral springs is limited by the size of material composing the springs and the diameter of their coils, a single spring capable of doing the work would be unduly large.

The proper function of the rope or chain is to be at all times in tension and in engagement with the faces of the sheave wheels to avoid back lash, climbing over the flanges, and to act at the very instant the rebound of the vehicle spring commences. Otherwise, when the bound in the vehicle spring has reached its limit and the pulley blocks are close together, the sudden starting of the rebound action would put an undue strain on the end of the chain rigidly attached to a fixed point, without the intermediary of the spring. This might lead to breaking of the chain or parts of the block. With the coil spring ready to give slightly, the shock of the rebound is resisted and is gradually retarded without undue strain on any of the parts.

In Fig. 4, I have shown a modification in which, instead of helical coil springs, spirally wound springs 25 are employed. These springs are provided with ratchet and pawl devices 26, by means of which tension in the chain may be readily and quickly adjusted. This means of producing and varying the tension of the chains may be found more desirable than that shown in Fig. 1, on account of the compactness of the springs and the greater ease of attachment. It is also of course, possible to employ pulley blocks having installed within them such spiral tension springs as an integral part thereof. This construction I have illustrated in Figs. 5, 6 and 7. In these figures, 27 designates the pulley blocks in the form of narrow sprocket wheels. These wheels are rotatably mounted on non-rotating axles 28. Included in each wheel is a fairly strong spiral spring 29, one end of which is rigidly attached to the axle, the other end being attached to the wheel. When the wheel is revolved against the tension of the spring, the spring resists this movement and tends to turn this wheel a number of revolutions back toward its original position. The sprocket chain 30 is threaded through the blocks which have been previously wound to give these springs the desired tension. One end of the chain is fastened to the end wheel of one of the series of wheels, and the other end of the chain is fastened to the opposite end wheel of the other series. This spring gives a very compact and satisfactory device for the purpose. The sprocket wheels can be rotated on their shafts while the chains are disconnected therefrom so as to give their included springs any desired degree of initial tension.

I do not wish to be understood as limiting myself to the use of springs of any particular character or to the means herein described of securing the proper tension in the chains, as this may be done in various ways within the scope of my invention. For instance, instead of employing a separate spring or springs, for imparting tension to the chain or other flexible member of the block-and-tackle, I may use a flexible member having inherent spring tension, such as a coiled spring belt of the character shown in Fig. 8.

The advantages of my invention are many. The simplicity of construction and arrangement is such that any wear short of that which would cause eccentricity in the sheave wheels or their actual breakage will not diminish in the slightest degree its action or efficiency, and where proper proportions are employed, there will be no danger of such breakage, by reason of the ease and flexibility of the action. The device is therefore designed to last as long as the life of the vehicle and with little attention save occasional lubrication and exclusion of grit by means of any suitable flexible inclosing casing.

The application of the device to the front axle of a vehicle is similar to that for the rear axle and is equally simple and flexible. Occasionally in automobiles the oil drip pan under the engine forward may extend so low as to preclude the use of helical coil springs and the herein described method of fastening them. In such cases, however, the pulley blocks may be equipped with spiral coil springs which take up very little room and which can be attached to the same side of the frame or structure upon which the individual sets of blocks are attached. Even in such cases, however, the helical springs can often be used by mounting the blocks on the frame and axle, with their axes at or near a right angle with the line of the frame, and fastening the helical coil springs attached to the leading-off chains to points on the frame forward or aft on which the respective sets of blocks are mounted.

I claim:

1. A shock absorbing device for spring equipped vehicles, comprising a flexible connection between the running gear and the spring supported frame of the vehicle, said connection consisting of a set of blocks and tackle, the running member of the same being threaded through the blocks and having means for constantly opposing a flexible resistance to the separation of said blocks; substantially as described.

2. A shock absorbing device for spring equipped vehicles, comprising, in combination, a wheel axle, a vehicle frame spring supported on the axle, and a set of pulley blocks and tackle, said frame and axle each having a pulley block of said set attached thereto, said blocks having a running member threaded therethrough, and said running member having constantly acting tensioning means for flexibly resisting the separation of the block through the medium of the running member; substantially as described.

3. In a shock-absorbing device for vehicles, the combination of a vehicle frame and wheel axle, of a spring supported on said axle, pulley blocks mounted on both the frame and axle, and a running member connecting and running through said blocks, said running member having means for constantly producing tension therein, substantially as described.

4. In a shock-absorbing device for vehicles, the combination of a vehicle frame and wheel axle, a bowed spring supported on the wheel axle, a set of pulley blocks mounted on both the frame and axle, a running member connecting the two sets of blocks and running through them, both ends of the chain being free to move, and having means for producing flexible tension in the running member, substantially as described.

5. In a shock-absorbing device for vehicles, the combination of a vehicle frame and wheel axle, a bowed spring supported on the wheel axle, a set of pulley blocks mounted on both the frame and axle, a running member connecting the two sets of blocks and running through them, both ends of the running member being free to move, and springs attached to said running member, substantially as described.

6. A shock-absorbing device for vehicles, comprising a vehicle frame, a wheel axle, a spring mounted on the wheel axle, a set of pulley blocks mounted on the frame, another set of pulley blocks mounted on the axle, said sets of blocks having their respective axes at an angle to each other, a running member working through said blocks, and spring means attached to said running member to give a constant tension thereto, substantially as described.

7. A shock-absorbing device for vehicles, comprising a set of pulley blocks mounted on the vehicle frame, another set of pulley blocks mounted on a wheel axle of a vehicle, the two sets of blocks having their axes at an angle to each other, and a running member working through said blocks and having its ends attached to the vehicle, substantially as described.

8. A shock-absorbing device for vehicles, comprising a set of pulley blocks attached to the vehicle frame, another set of pulley blocks attached to a wheel axle of a vehicle, the two sets of blocks having their axes at an angle to each other, and a running member working through said blocks, together with means connected to said member to create a constant tension therein, substantially as described.

9. A shock-absorbing device for vehicles, comprising a set of pulley blocks mounted on the vehicle frame, another set of blocks mounted on a wheel axle of the vehicle, the two sets of blocks having their axes at an angle to each other within parallel planes, a running chain working through said blocks, and springs connected to the chain, and having means for varying their tension, substantially as described.

10. A shock-absorbing device for vehicles, comprising a set of pulley blocks mounted on the vehicle frame, and another set of pulley blocks mounted on the wheel axle of the vehicle, the two sets of blocks having their axes at an angle to each other, a running member working through said blocks and having means for creating a constant tension thereon tending to prevent separation of the two sets of blocks; substantially as described.

11. A shock absorbing device for spring equipped vehicles, comprising a pulley mounted on the vehicle frame, another pulley mounted on the running gear, and a flexible member running over said pulleys, said flexible member having means acting to constantly draw the pulleys toward each other and thereby oppose the separation of the vehicle frame and running gear; substantially as described.

In testimony whereof, I have hereunto set my hand.

KLAUS J. STEINER.

Witnesses:
H. M. CORWIN,
GEO. H. PARMELEE.